March 29, 1927.  
J. C. RITTER  
1,622,348  
CREAM SCOOP  
Original Filed April 1, 1925    2 Sheets-Sheet 1
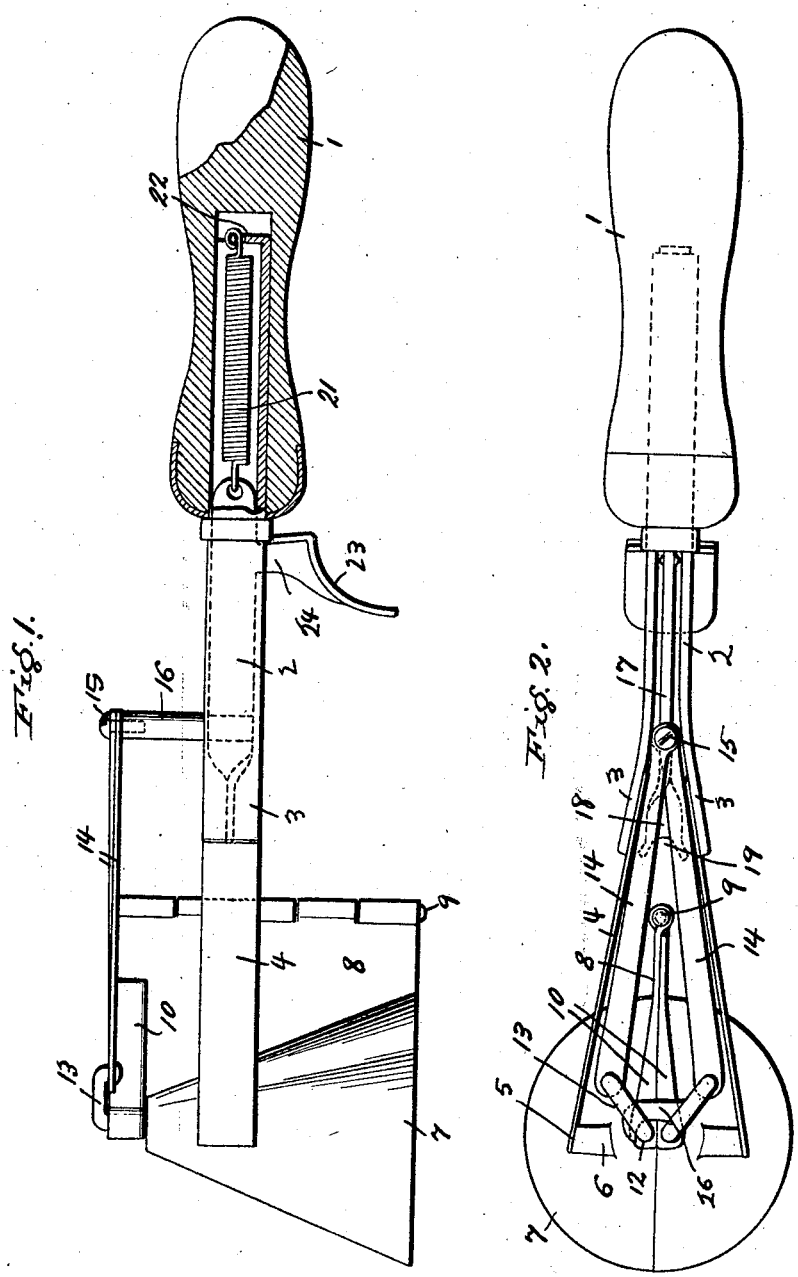
John C. Ritter  
INVENTOR  
BY Victor J. Evans  
ATTORNEY
WITNESS: Gerald Hennessy March 29, 1927.
J. C. RITTER
1,622,348
CREAM SCOOP
Original Filed April 1, 1925    2 Sheets-Sheet 2
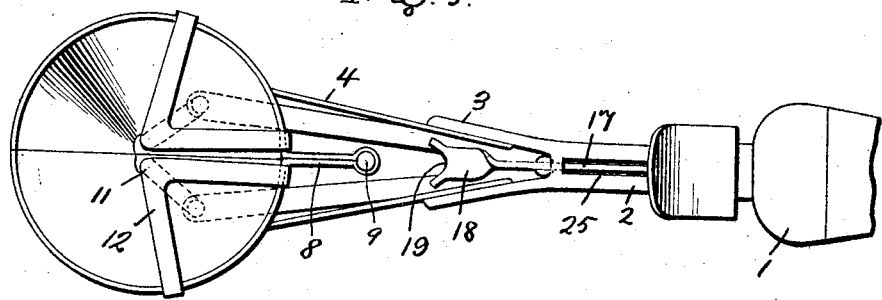
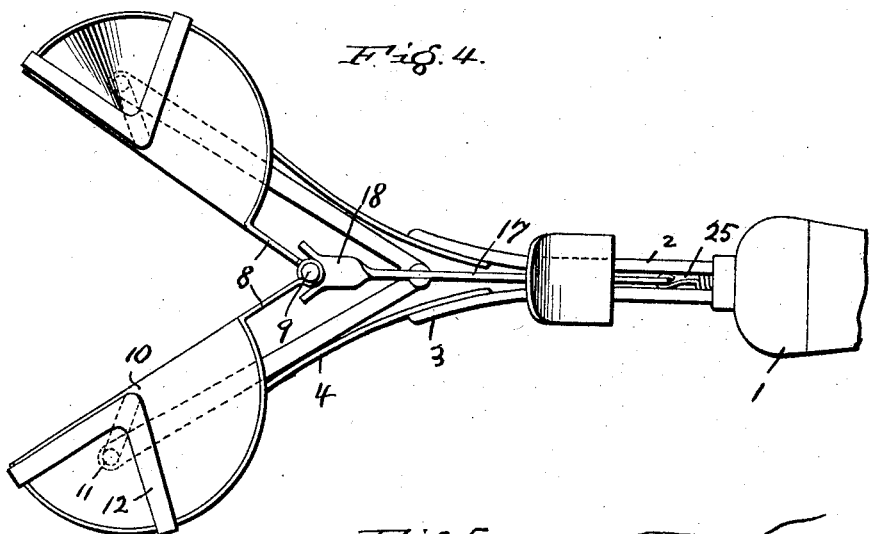
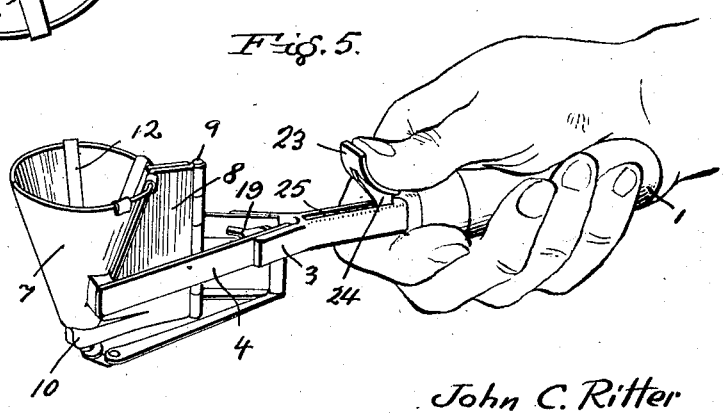
John C. Ritter
INVENTOR
WITNESS:

Patented Mar. 29, 1927.

1,622,348

UNITED STATES PATENT OFFICE.

JOHN C. RITTER, OF PORTLAND, OREGON.

CREAM SCOOP.

Application filed April 1, 1925, Serial No. 19,928. Renewed February 10, 1927.

An object is the provision of a device for filling cones of ice cream.

A further object is the provision of a device for this purpose which includes a two-part cone-shaped mold having means for holding the sections thereof locked in closed position, means in the nature of a scraper in each of the cone sections revoluble to scrape the cream from the mold prior to the opening of said mold, and means operable by the pressure of a thumb of the user of the mold for swinging the mold sections to fully open position to release the cone of ice cream to permit of the same dropping into a holder formed of baked batter.

In the further disclosure of the invention reference is to be had to the accompanying drawings which form part of this application.

In the drawings:

Figure 1 is a side elevation of the device, parts being in section.

Figure 2 is a bottom plan view thereof.

Figure 3 is a top plan view thereof.

Figure 4 is a similar view but showing the mold sections in open position.

Figure 5 is a perspective view to illustrate the manner in which the device is operated.

Referring now to the drawings in detail, 1 designates the handle of the improvement. Fixed in the handle but projecting outwardly therefrom there is a shank 2, preferably of metal. The shank has its outer end forked and the arms thus provided are disposed at outward angles with respect to each other. Secured to each of these arms 3 there is a flat spring 4. Each spring has its free end secured, as at 5, to a lug 6 formed on the outer sides of the cone-shaped mold 7. The mold is constructed of two sections which are normally forced into contacting engagement with each other by the springs 4.

Each mold section has on its inner edge a flat wing 8. These wings are extended toward the handle 1 and have their outer ends rounded upon themselves and notched or cut away to provide interengaging barrels through which passes a pivot member 9.

The wings 8 have corner extensions in the nature of fingers 10 disposed below the reduced end of the mold sections. Passing through bearing openings in the fingers 10 there are short shafts 11 for substantially V-shaped blades 12. One pair of blades is arranged in each of the mold sections, and each of the short shafts 11 has its outer end formed with an angle extension 13, and to these extensions there are pivotally secured links 14 which have their free ends overlapping. Passing through the lapping ends of the angularly disposed links 14 there is a pivot member 15 that secures the said links to a post 16 which is carried by an actuating member 17. The actuating member is in the nature of a flat plate that is slidably received in the slotted shank 2. The actuating member 17 has its outer portion, or the portion thereof next to the mold, given a half twist to provide the same with a flattened and widened end 18, and this end is notched as at 19.

The shank has one end received and secured in an opening in the handle 1, and this end is upset, as at 22. The actuating member 17 has one end received in the said opening in the handle, and secured to this end there is a helical spring 21 which is also connected to the upset end 22 of the shank 2.

Secured or formed with the actuating member there is a finger piece 23 whose shank 24 passes through an elongated slot 25 in the shank 2.

As disclosed by Figure 5 of the drawings, the operator grasps the handle and places his thumb on the thumb piece 23. An outward movement of the thumb piece causes the outward sliding of the actuating member, which, incident to its link connection with the ends 13 of the shafts for the blades 12, will revolve the blades around the interior of the mold, thus cutting the cream in the mold. This occurs before the mold sections are opened. The thumb piece must be moved away from the handle a determined distance before the notched end 19 of the actuating member contacts with the pintle 9, and it is by virtue of said contact and pressure upon the pintle that the mold sections are swung to open position. When in open position the V-shaped cutters are disposed as disclosed in Figure 4 of the drawings and do not assume their normal position until pressure on the thumb piece is relieved and the spring 21 brings the actuating member to initial position and the springs 4 swing the mold sections to closed position.

Having thus described my invention, what I claim as new, is:—

In an ice cream cone disher, a handle, a slotted shank having one end received in the handle and having its opposite end forked, a flat spring secured to each arm of the fork, a two-part conical mold, outstanding lugs on the sides of the mold to which the respective flat springs are connected, flat wings extending from the confronting inner edges of the mold sections having their outer ends notched and rounded to provide interengaging knuckles and a pintle connecting said knuckles, each of said wings having one of its corners provided with a finger extension arranged beneath the reduced end of each of the mold sections, a crank shaft having a straight portion journaled through each finger and entering the mold, a substantially V-shaped cutter arranged in each mold section and connected to the mentioned shafts, a link pivoted to each of the crank shafts, an actuating member comprising a plate slidable through the slotted shank, spring means between the shank and actuating member for holding the latter normally in one position with respect to the former, a post on the actuating member to which the free ends of the links are pivoted, said actuating member having an outer flattened and widened portion whose outer end is notched, a thumb piece fixed on the actuating member and guided through the slotted shank, and the notched end of the actuating member being disposed in a line with but normally away from the pivoted end of the wing members.

In testimony whereof I affix my signature.

JOHN C. RITTER.